Patented Oct. 15, 1935

2,017,797

UNITED STATES PATENT OFFICE 2,017,797

MANUFACTURE OF COMPOSITE ARTICLES

Henry A. Gardner, Washington, D. C.

No Drawing. Application February 14, 1934,
Serial No. 711,278

17 Claims. (Cl. 91—70)

This invention relates to the manufacture of composite articles; and it comprises methods of making composite articles wherein compositions containing an arylsulfonamid resin dissolved in an alkaline aqueous solution and having a consistency varying from freely mobile liquids to thickened viscous masses, are applied to or admixed with base materials such as sheets, films, fibers or granular masses of inert substances and the like, and the sulfonamid is precipitated on and united with the base material, as a coating layer, film, or sheet, the alkali being removed at a suitable time by washing; precipitation of the arylsulfonamid resin being advantageously by dilution with water, and it particularly comprises methods wherein cellulosic films of sheets, advantageously thin sheets of regenerated cellulose, are coated with said compositions in such a manner as to form a unitary composite sheet, the alkali being leached or washed out of the coating film either before or after drying the coated material, the arylsulfonamid resin being advantageously precipitated on the cellulosic sheet by contacting the coated sheet with water; and it also comprises composite articles containing arylsulfonamid resin as a binder or coating layer, particularly cellulosic sheets coated with said arylsulfonamid resins, especially when prepared by said methods, the said coated sheets being self-sealing, resistant to water and having valuable electrical properties; all as more fully hereinafter set forth and as claimed.

This application is in part a division and in part a continuation of my prior copending application Serial No. 581,275. In that application I disclose coating compositions and impregnating solutions which comprise an arylsulfonamid resin dissolved in alkaline aqueous solutions and various processes utilizing those coating compositions and solutions. The present application is directed to the products obtainable by such processes and to particular processes for making these articles.

Toluenesulfonamid and certain similar sulfonamid bodies derived from xylene, benzene or other aromatic hydrocarbons, when condensed with formaldehyde or other aldehyde, form interesting compounds which are mostly resinous in nature. I have found that alkaline aqueous solutions of these resins have unusually valuable and important properties. While the resins can be readily brought into solution by the use of aqueous alkali, but the alkali plays, so to speak, the part of a temporary solvent. Toluenesulfonamid resin, and its congeners, dissolve freely in a caustic soda solution with a strength between 6 and 10 per cent. The solution is transparent, freely mobile and stable. With pure preparations, the solution is water white and colorless. It enters capillaries and can be used in impregnating paper; one of the uses hereinafter stated. A solution in 6 per cent caustic soda solution carrying its own weight of toluenesulfonamid resin, has the stated properties. This solution can be diluted with water down to an alkaline strength with respect to the water of somewhere around 4 per cent without loss of its transparency. Upon diluting with further amounts of water, first opalescence and then white turbidity occur, while, on increasing the amount of water further, the toluenesulfonamid resin goes out of solution. Precipitation is practically complete when the alkalinity is less than 3 per cent. The precipitate in the wet state is a beautiful white, opaque material, which, once formed, is insoluble in the dilute alkaline mother liquor.

I have found that the original clear alkaline solution, on drying, forms a film or layer of clear resin. This, on washing as by immersion in water, first becomes white and opaque, giving up alkali to the water. After washing and drying, the layer becomes clear and transparent, and is insoluble in water.

In most embodiments of my invention, I first form a clear solution of resin in an alkali solution usually employing an 8 per cent aqueous caustic soda lye. Other strengths of alkali are not as advantageous. A similar concentration of potash solution may be used. An 8 per cent caustic soda solution dissolves toluenesulfonamid resin in amounts up to its own weight, convenient strengths for packaging and shipment. The used can, and frequently does, dilute this stock solution before use to, say, 4 per cent caustic alkali, calculated on the amount of water present. The concentrated liquid or the dilute liquid can be utilized in many ways. It can be applied to paper and the paper washed with water, setting free a resin in the pores. On drying the washed paper, it is found waterproofed, in the sense that the fibers no longer take up water readily. On hot pressing the impregnated paper, the contained resin melts to a continuum, giving a translucent or transparent paper of good waterproof properties. The index of refraction of the resin and of the paper fiber are not widely different, whence the transparency. The paper thus prepared is freely flexible and may be used for wrapping food.

In the specific embodiment of this part of my invention, I utilize my discovery in improving commercial sheeted, regenerated cellulose ("cellophane"). An 8 per cent solution of caustic soda is mixed with an equal weight of toluenesulfonamid resin. The resin goes into a clear solution. The liquid is then diluted with its own volume of water. Sheeted regenerated cellulose is immersed in this liquid and allowed to remain in contact for a period of about 30 minutes or less. The sheet is then passed between rolls to remove excess solution and washed with water. This gives a slightly opaque aspect to the layer, the opaqueness disappearing on drying. The washed material is dried. There is an increase in strength, which is usually of the order of 10 per cent, over the original tensile strength. The washed, dried sheet may or may not be heated to fuse the resin in situ. One advantage of the "cellophane" thus treated is that it now can be lacquered readily, the lacquer bonding well; there is a tenacious adherence between the lacquer film and the base. Ordinarily it is difficult to lacquer sheeted regenerated cellulose with nitrocellulose lacquers. The coherence is poor and stripping is apt to occur.

Another advantage of my coated sheets is that they are self-sealing. If two or more sheets are superimposed or portions of the same are overlapped, and heat and pressure applied to the juxtapositioned parts, they are sealed or bonded together in impervious union or joint. Thus by the term "self-sealing" I mean the property of sealing or uniting under suitable heat and pressure, without the necessity of using solvents or additional adhesives to secure an effective bond.

This property of self-sealing renders my coated sheets advantageous in the manufacture of containers and the like for packaging various materials and articles. For instance, these sheets may be wound on mandrels or rolls to make tubes and the like, heat and pressure being applied to unite the overlap of the plies or layers into a unitary structure. The mandrel may be heated and the sheet wound under considerable tension, thereby securing heat and pressure. Again, a heated roll may be pressed against the surface of the tube or cylinder as it is being wound on a mandrel or other suitable form.

Also stamped sheets or cut blanks may be fabricated into boxes and the like, overlapping edges being sealed under heat and pressure to unite the parts into a desired structure. The overlapping portions when sealed give reinforced edges and corners. In so making containers and the like, two or more plies or sheets may be used to obtain the desired strength and rigidity. Further increase in rigidity may be obtained by using a framework of wire, metal, wood, etc., as a reinforcement; the coated sheets being fabricated on such reinforcing framework. Tubes, boxes and other containers so made are usually transparent or translucent, thus permitting visual inspection of their contents without opening the package.

My coated sheets may be shaped into containers in the manner described in Patent No. 1,792,388 and the container self-sealed. No solvent is necessary in the sealing step; application of heat and pressure is sufficient.

The finished containers, made by my processes and with these new coated sheets, may be lacquered or varnished in the same way as the coated sheet, if desired.

While aqueous solutions of caustic soda are advantageous in dissolving the resin, other alkaline solutions may be used.

I can use an ammonia solution of the toluenesulfonamid resin and obtain a still greater improvement in tensile strength of the final material, but at a somewhat greater cost.

In using my new solution as a paint or varnish it is applied to a suitable surface, alone or admixed with a pigment, such as barium sulfate, and dried in place. On washing the dried article with water, the alkali is quantitatively removed. If desired, the washed, dried, coated surface may be warmed to fuse the resin in place. This treatment is feasible, because of the low melting point of my precipitated resin. By using a mixture composed of toluenesulfonamid resin dissolved in 8 per cent caustic soda solution and admixed with filler, a good cold water paint can be made, applicable for many purposes.

The described solution offers an excellent means of waterproofing concrete, cement and other surfaces in exposed situations. It is merely necessary to paint a porous surface with the solution, allow it to be absorbed and then wash with water. The action of the water precipitates the resin in the pores.

In using my invention for treating paper, an alkaline toluenesulfonamid resin solution admixed with a filler may be used both for coating and for waterproofing. On application of a composition of toluenesulfonamid resin dissolved in 8 percent caustic soda and thickened with barium sulfate, clay or other paper coating materials, a portion of the solution enters the pores and the rest remains as a coating; acting as a binder for a pigment layer. By washing the paper with water, or by drying and then washing, an excellent coated and impregnated paper is obtained. By heating the coated paper sufficiently to fuse the resin, an improved article is made.

Paper treatment and the treatment of textile sheets may be continuous. For instance, a continuous web of paper may be first passed through the aqueous alkaline solution of the toluenesulfonamid resin, passed through rolls to squeeze out excess and then passed into a bath of water. Upon contact of the impregnated web of paper with the water, the resin is precipitated to form an integral portion of the paper. The alkali is dissolved and washed out in the water bath. The fibers are individually and thoroughly coated. After the washing with water, the web of paper may be dried. If desired, the dry paper may be then heated to fuse the resin. This fusion of resin may be effected by passing the paper over hot rolls.

In making a paint-like composition, 100 parts by weight of caustic soda solution containing 92 parts of water and 8 parts NaOH are used to dissolve 100 parts of toluenesulfonamid resin. Into this liquid is incorporated its own weight of barium sulfate or similar pigment or filler. This gives a pasty mixture which can be usefully employed in coating paper and many other materials. The composition may be applied to paper or textile sheets, or a web of paper may be continuously treated. The operation is exactly the same as before, save that a paper is obtained carrying a surface layer or coating of the pigment bonded by the resin. Washing with water, drying, etc., are as before. Hot pressing is usually desirable.

The composition with the filler may be applied to a wall or other surface. It may be brushed or sprayed on a wall of concrete, cement, wood, etc., and allowed to dry in place, being afterward sprayed with water to set the resin and remove the alkali and then dried. The preliminary drying is chiefly to give opportunity for the liquid to penetrate the pores. Upon final drying, a good coating, strongly bonded to the surface, is produced. In these cold water paints, all or part of the barium sulfate, or blanc fixe, may be replaced with zinc oxid, titanium oxid, white lead, zinc sulfid, lithopone, or other white pigment. If colored paints are desired, suitable colored mineral pigments or dyes may be added. A small amount of glue or casein is sometimes a useful addition.

In another embodiment of my invention, 50 parts by weight of toluenesulfonamid resin are dissolved in 50 parts of a 6 per cent caustic soda solution (94 parts of water and 6 parts of caustic soda). The liquid is used to impregnate porous, granular or powdered fillers, such as wood flour or oxidized oil meal. The impregnated filler is mixed with a suitable quantity of water to precipitate the resin on the filler. The excess of water can be drained off, taking the alkali with it. The washed mixture of filler and resin is dried to remove the rest of the water. Drying may be advantageously done in a current of warm air. The humidity of the air may be controlled, if desired. The dry mixture of resin and filler thus produced gives a thermoplastic molding composition which is advantageous for many purposes. It may be molded under heat and pressure; the shaped article being set by cooling after shaping. Molded articles may be made from pulp board impregnated with solution, washed, dried and then hot pressed. Laminated sheets may be made by assembling thin sheets prior to hot pressing.

I have discovered that by pouring these aqueous solutions of arylsulfonamid resin into water, the resin is precipitated as a continuous film or thread. The alkali is removed by the water during the precipitation. In one embodiment of my invention, these solutions of resin, either with or without added ingredients, such as fillers, pigments, etc., may be extruded into bath of water to form sheets. The extruded sheets after drying, may be used in forming laminated articles, the dried, extruded films being superimposed or inserted between other materials and the assembled mass hot pressed. In such processes it is advantageous to use, as the other material, the coated sheets prepared according to my other methods. The resin of the coating and of the extruded mass unite together, forming a continuum of resin in the hot pressed article, interlocking the layers. In making such laminated articles, regenerated cellulose sheets containing co-precipitated resin, obtainable by the processes disclosed in my Patent No. 1,864,427 may be used to advantage. Using such sheets, a continuum of resin throughout the laminated article is obtained. The final hot pressed article is, so to speak, a continuous mass resin reinforced with the sheeted material, filler, etc., in the respective portions thereof. In other words, various types of reinforcements can be positioned where they are wanted and are desirable.

The molded article can be given a final coating of varnish or lacquer.

The dried extruded sheets may be also used directly in molding. They may be hot stamped to produce shaped articles. Again molding blanks may be cut or punched from the extruded sheet and hot pressed in a subsequent operation. For instance, discs may be punched, the discs inserted in the tubes made by my other methods, and the assembled parts united under heat and pressure to form cylindrical containers; the bottom being first inserted and then the top sealed in after the container is filled with the material to be packaged. In an alternative method the bottom can be built in while the tube is being formed.

In making extruded sheets for direct molding, the composition may be extruded in relatively thick layers. The dried extruded sheets or bands may be leached with water to remove residual alkali if desired, and again dried.

Instead of recovering the extruded, precipitated composition as a sheet, it may be processed as a plastic mass. The precipitated mass is somewhat similar to coagulated rubber obtained by acidifying latex and may be processed in a like manner. For instance the precipitated mass may be worked on rolls and washed with a spray of water during the working. After the alkali is removed, the wet mass may be further worked on heated rolls to dry it, the heat maintaining the mass plastic, even after the mass is dry. The dry, plastic mass while hot, may be directly used in molding. Injection molding may be used.

I have further found that if the aqueous solution of arylsulfonamid resin contains some organic solvent, such as a little ether, upon pouring the solution into water, the resin tends to precipitate as finely divided particles instead of in the continuous film. Precipitation of the resin in finely divided form is advantageous in some instances. When the precipitated mass is to be subsequently hot milled, precipitation of the resin as fine particles attached to the filler, etc., may be used. This permits a separation of most of the water by mere draining. After complete or partial drying the mass can then be hot milled and pressed.

My generic methods are quite flexible and are easily adaptable to the various practical requirements necessary to produce particular products by a desired process.

Composite mixtures may be made containing other resins, such as shellac, and other binders, such as casein. Both casein and shellac are soluble in the alkaline aqueous liquid. Latex may be admixed. One suitable coating composition for paper is made by adding 5 parts by weight of casein and 5 parts by weight of shellac to 50 parts of an alkaline aqueous solution of toluenesulfonamid resin, this solution consisting of equal weights of the resin and of a 6 per cent caustic alkali solution. To the solution may be added 25 parts of barium sulfate. This composition is particularly adapted for the treatment of paper. The impregnated and coated paper may be given a high gloss finish by hot rolls.

In impregnating and coating paper, "cellophane" and like transparent thin sheets of cellulosic material (regenerated cellulose, cellulose acetate, etc.), I have mentioned immersion of the sheet material in a freely mobile liquid composition of these resins to apply the coating thereto. I may also apply the coating by other methods. When a coating containing other ingredients is desired, the aqueous composition may be converted into a more viscous condition and applied by apparatus wherein a pool of the coating composition is maintained between two rolls revolving in opposite directions, the sheet material passing around one of the rolls into and out of contact with said pool, for instance, the machine disclosed in Patent No. 1,838,538.

In such methods, the coating composition must have sufficient body or viscosity to remain as a pool between the rolls. My freely mobile composition may be brought to the required consistency by the addition of other ingredients, such as fillers, pigments, etc. My pigmented or filled compositions are readily adapted to this method of coating. Bentonite is advantageous as a filler for increasing the viscosity of such compositions. When mixed with water or alkaline solutions bentonite tends to gel or thicken the solution. Casein is another advantageous ingredient. The casein-containing coating composition mentioned ante in this specification is adaptable to these coating methods. Satisfactory compositions for these purposes may be obtained by compounding my aqueous solutions of arylsulfonamid resins with appropriate pigments, fillers, thickeners and the like.

The sheets thus coated, may be further processed to precipitate and unite the resin with sheet material as has been set forth ante.

In lieu of paper and "cellophane" coated sheets produced by my other methods may be further coated with pigmented or filled compositions by these roll coating methods. For instance, cellophane sheets may be immersed in a simple solution of toluenesulfonamid resin in alkaline aqueous medium, the coated sheet contacted with water and then dried. The coated sheet thus prepared may then be further coated with a pigmented or filled resin composition by the roll coating method using my thickened viscous solutions. The second coating may be a relatively thick layer. Coated sheets thus made are usually opaque. In such methods, two or more of the transparent coated sheets may be plied together before the second or pigmented coating is applied. In this way compound sheets of desired thickness, strength and flexibility may be obtained. These composite sheets may be used in the manufacture of belts, pocketbooks, wearing apparel and various novelties. They may have an appearance similar to patent leather. The finished articles can be varnished or lacquered.

In such method the use of regenerated cellulose sheets containing co-precipitated resin, is advantageous and permits the formation of bodies wherein the resin is a continuum, reinforced by the other materials.

Again my coated sheets or bands composed of several sheets plied and united together, may be further coated using pigmented compositions applied by calendering methods. In this embodiment a hot plastic composition is calendered on to the previously coated sheet or sheets in a manner similar to that employed in the manufacture of rubber-coated fabrics. Valuable composite sheets are obtained.

In my composite sheets, the relatively thicker layer may be an outside coating or it may be an internal intermediate layer. In either case, that layer is bonded to and firmly united with the reinforcing sheet material. For instance, a resin-coated cellulosic sheet may be placed on top of a pigmented coated sheet and the assembled sheets passed between heated rolls or simply hot pressed, to unite them. The pigmented coating thus becomes an intermediate layer between the two coated sheets.

My sheet materials carrying a plurality of coatings find many uses in the arts. The composite sheets having united together, a sheet of regenerated cellulose and co-precipitated toluenesulfonamid resin, a layer of toluenesulfonamid resin, a thicker layer of pigment and said resin, and a final coating of said resin and a cellulose ester, are very valuable and useful. One or more of these layers or coatings may be omitted or changed to alter the properties of the final sheeted material.

In my various processes and products, sheets of cellulose esters and ethers, such as nitrocellulose, cellulose acetate, etc., may be used in lieu of regenerated cellulose or "cellophane". Also glassine paper (made from long beaten cellulose pulp) may be used. My inventions are broadly applicable to sheet materials and either flexible sheets or stiff composite sheets may be obtained.

In all of the above compositions, resins derived from xylene, benzene, naphthalene and other aromatic sulfonamids may be substituted for the toluenesulfonamid resin. Other fillers, either mineral or fibrous, may be substituted for the barium sulfate and the wood flour mentioned above. Glue and like substances may be substituted for casein.

In many cases, in applying the composition of the present invention for coating and impregnating, it is advantageous to dilute it to a point where a further addition of water will form a precipitate. That is, the solution is brought to incipient precipitation before being used. In many cases, it is advantageous to dry a coated surface before the application of water; while in other cases, it is better to dry after the application of water and the washing. However, in all cases, there is a final drying and sometimes a following heating to fuse the resin in place.

In the case of the addition of bodies normally soluble in alkaline solution, such as shellac, casein, latex, etc., I have found that precipitation of the toluenesulfonamid resin with water tends to bring down these bodies; probably because their solution is more or less of a colloid character.

One useful embodiment of the present invention is in forming coating layers on floors under construction. By pouring the solution of the present invention on a concrete floor, brushing or allowing it to flow to even texture and allowing it to stand overnight, on washing with water the next day, the composition is converted, after again drying, into a rubbery, resilient layer, pleasant under foot and of good insulating value. The coated floors can be used as soon as they are dry and resist the abrasion of ordinary use indefinitely long. In many ways, the coating is equivalent to linoleum.

The properties on dilution of the resin solution with water appear, to some extent, to depend on a dissociation phenomenon; depending partly on the amount of water and also, to some extent, upon the ratio between the alkali present and the resin.

In many cases, I use a small proportion of a volatile solvent, such as ether, alcohol or acetone, in the water solution. I may, for example, cut the resin with ether; mixing 15 parts of ether by weight with 85 parts of resin to obtain a liquid mass. These cut resins may be used in the foregoing described embodiments of my invention. When so used, the dilution conditions become somewhat different, more water being necessary to produce the same amount of precipitation. The main purpose of first cutting the resin with a solvent is, however, convenience in making up the composition of the present invention, as it will then pour, whereas the ordinary commercial form of resin is viscous and difficult to handle. When I use it, I generally melt it and add it to the alkali solution in molten form.

What I claim is:—

1. In the manufacture of coated sheets of cellulosic material, the process which comprises impregnating a sheet of paper with an alkaline solution of arylsulfonamid resin, drying the impregnated paper, contacting the dried sheet with water to leach out the alkali and then drying the coated paper.

2. In the manufacture of coatings, plastic compositions and the like, the process which comprises applying a composition comprising an alkaline aqueous solution of an arylsulfonamid resin to a base material and subsequently precipitating said resin as a continuous film on said base material from said composition by the addition of water.

3. The process of claim 2 wherein the base material is dried subsequent to said application of said alkaline solution but prior to the said addition of water.

4. The process of claim 2 wherein said additional water is used in diluting said alkaline solution thus precipitating the arylsulfonamid resin.

5. In the manufacture of coatings, plastic compositions or the like, the process which comprises applying a composition comprising an alkaline aqueous solution of an arylsulfonamid resin to a base material, drying the material, subsequently precipitating the resin as a continuous film on and adhering to said base material from said composition by the addition of water and heating the material to fuse the resin in place.

6. The process of claim 5, wherein the material is heated subsequent to the precipitation of the resin to fuse the resin in place.

7. The process of claim 5, wherein the composition comprises a solution of an arylsulfonamid resin in a substantially equal weight of a caustic alkali solution, the caustic alkali being in the proportions of about 6 to 8 per cent based on the weight of the water.

8. In the manufacture of coatings, the process which comprises applying a coating composition comprising an alkaline aqueous solution of an arylsulfonamid resin containing sufficient alkali to hold said resin in solution, to a base material and drying the coating thus applied to form a solid film.

9. The process of claim 8 wherein the said solid film is subsequently washed with water to leach out the alkali without destroying said film and the so washed film then dried.

10. In the manufacture of coatings, the process which comprises applying a coating composition comprising an alkaline aqueous solution of an arylsulfonamid resin containing sufficient alkali to hold said resin in solution, to a base material and then contacting the film thus applied, with water to set said coating and to remove the alkaline substances contained therein.

11. The process of claim 2 wherein said base material is a sheet of cellulosic material.

12. The process of claim 2 wherein said base material is a sheet of regenerated cellulose.

13. The process of claim 2 wherein said base material is paper in sheet form.

14. The process of claim 2 wherein said arylsulfonamid resin is toluenesulfonamid resin.

15. The process of claim 5 wherein said arylsulfonamid resin is toluenesulfonamid resin and said base material is a sheet of regenerated cellulose.

16. The process of claim 8 wherein said base material is a sheet of regenerated cellulose.

17. The process of claim 10 wherein said base material is a sheet of regenerated cellulose and said alkaline aqueous solution of an arylsulfonamid resin is an aqueous solution of said resin in a 6 to 8 per cent alkali solution.

HENRY A. GARDNER.